United States Patent [19]

Hollenbeck et al.

[11] 4,000,352
[45] Dec. 28, 1976

[54] BATTERY SEPARATOR

[75] Inventors: Bonderinko Hollenbeck, Pelham, N.H.; Alan Lee Stockett, Belmont; Joseph Louis Tate, Brookline; Donald Merkel Simmons, Cambridge, all of Mass.

[73] Assignee: W. R. Grace & Co., Cambridge, Mass.

[22] Filed: June 1, 1972

[21] Appl. No.: 258,887

[52] U.S. Cl. .............................. 429/147; 428/156
[51] Int. Cl.² ........................................ H01M 2/14
[58] Field of Search ............ 136/145, 146; 161/29, 161/123, 130; 429/147

[56] References Cited

UNITED STATES PATENTS

| | | | |
|---|---|---|---|
| 2,117,382 | 5/1938 | Wells | 136/145 |
| 2,179,057 | 11/1939 | Schuetz | 161/130 |
| 2,465,493 | 3/1949 | Strickhouser et al. | 136/145 |
| 2,973,398 | 2/1961 | Hubbard et al. | 136/145 |

FOREIGN PATENTS OR APPLICATIONS

| | | | |
|---|---|---|---|
| 268,406 | 5/1968 | Austria | 136/145 |
| 518,249 | 11/1955 | Canada | 136/145 |
| 783,729 | 9/1957 | United Kingdom | 136/145 |

*Primary Examiner*—Donald L. Walton
*Attorney, Agent, or Firm*—Edward J. Hanson, Jr.; C. E. Parker

[57] ABSTRACT

A battery separator is provided that has a plurality of protrusions extending above the main surface thereof. The protrusions are arranged in an entirely new pattern which permits a minimum total area of the separator to be covered with protrusions and yet assures good contact with all areas of a battery's grid. This is done by arranging the protrusions in alternating rows in a manner blocking any openings between protrusions with which an element of the battery's grid could be registered.

Another aspect includes a compressible battery separator having compressible embossments.

9 Claims, 6 Drawing Figures

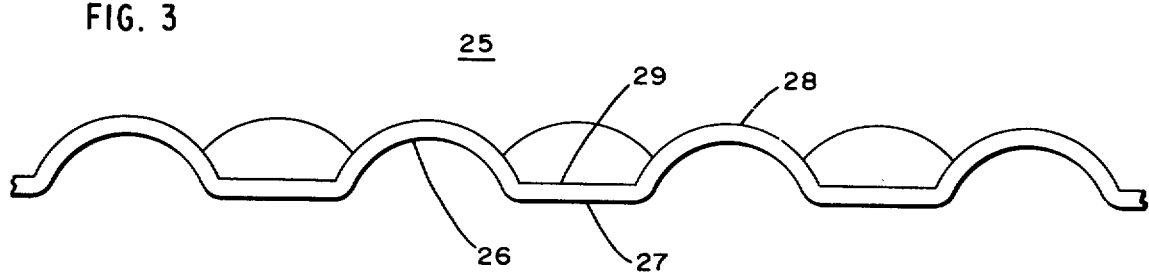
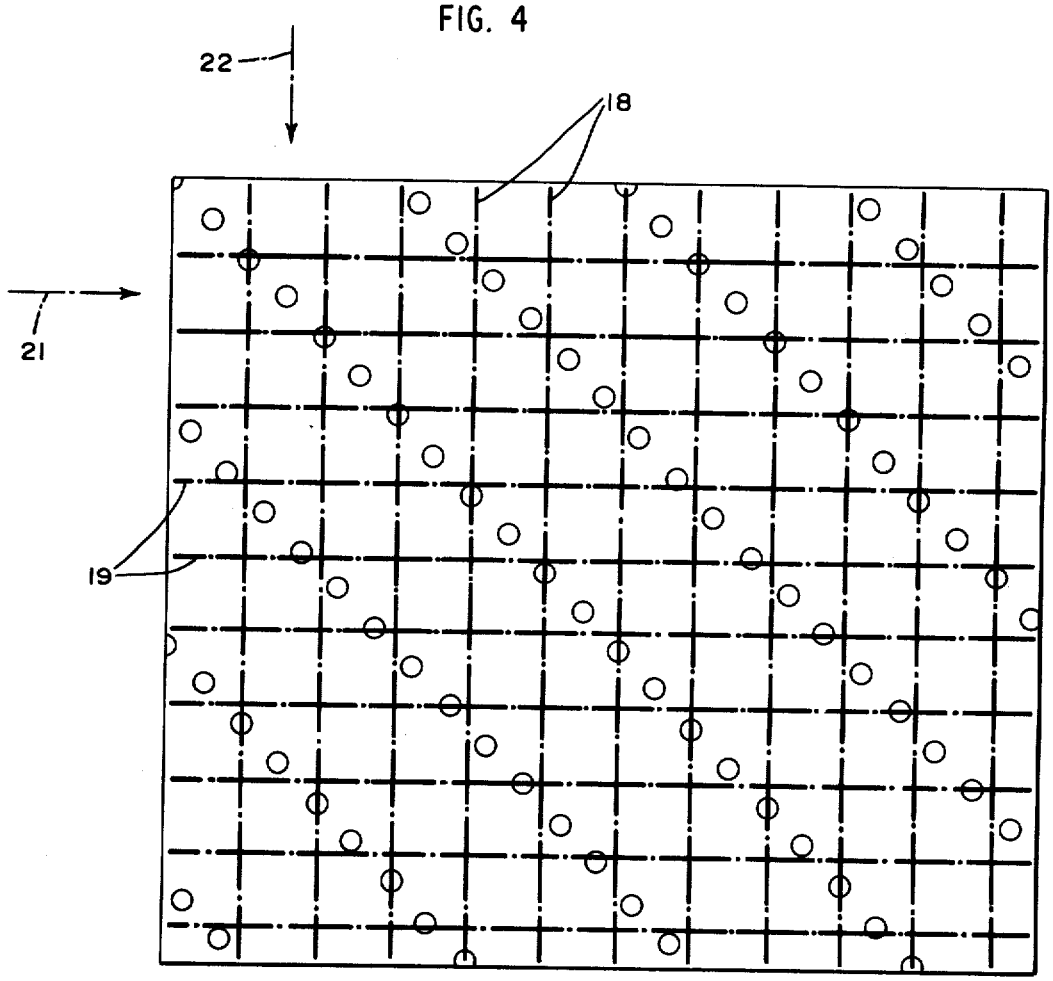

BATTERY SEPARATOR

BACKGROUND OF THE INVENTION

This invention relates to battery separators and the like and more especially to those having protruding elements extending above the plane of the main surface thereof.

Battery separators have in the past had main surfaces with members projecting thereabove in various patterns as illustrated by U.S. Pat. Nos. 2,694,744; 2,677,008; 2,172,382 and 2,198,845. The separators of the prior art have various deficiencies such as having the protrusions so aligned that while the protrusions would engage the paste of the battery plate and thereby provide the additional separator spacing they would not assure contact with substantially all of the grid members. This is illustrated in U.S. Pat. No. 2,694,744 by way of example. In many battery grids the horizontal and vertical grid members are not equally heavy. In these instances, the dominant or heavier grid wire or member is usually the vertical one. In other prior art separators, the protrusions have been so arranged as to exclude the settling of materials in the battery. Material shed from the battery plates and other materials which might accumulate in the battery should be allowed to fall down to the bottom of the battery. This would not occur with the separator shown for example in U.S. Pat. No. 2,198,845.

A discussion of various grid designs as well as other backround information may be found at page 28 and elsewhere in the book, *Storage Batteries*, by George Wood Vinal, fourth edition, John Wiley & Sons, Inc., New York, copyrighted 1955.

It is an object of the present invention to provide a superior battery separator.

It is a further object of the present invention to provide such a superior battery separator having reduced mass with maximum contact of the grid portions of the battery plates by thickened areas of the separator.

SUMMARY OF THE INVENTION

By an aspect of the invention a battery separator is provided that has an interrupted pattern of distinct portions. The separator is operable with a battery plate having a series of parallel spaced apart linear battery members extending in a first plane. These battery members would commonly be grid members of a battery plate. The separator includes a group of distinct separator portions arranged in a plane parallel to the first plane and in rows that extend diagonally with respect to the spaced apart linear battery members, with distinct portions in some rows offset with respect to the distinct portions in other rows so that when the separator is in operable relation with the battery members, a linear battery member cannot be aligned to miss all of the distinct portions. The distinct portions are so shaped that material shed from the plate and other sediment in the battery will not pile up on the distinct portions but will tend to slide off and fall on down in the battery.

In other special aspects the separator is in the form of a rectangular sheet having two outwardly facing opposite faces that have basically planar main surfaces with the rows of distinct separator portions extending across at least one of these faces at an angle of 30°–60° to each of the edges of the rectangular sheet. The distinct separator portions are preferably circular in shape with a diameter of about ⅛ inch, a height above the main surface of 15–62 mils and spaced about 3/16 inch apart in the rows with the separator having a total thickness of 18–92 mils.

In other aspects, the broken portions of a battery separator make at least one continuous coverage separator portion that diagonally crosses at least one vertical grid axis when the separator member is in operable relation with the battery grid. The broken portions are spread apart on axes parallel to the grid member they cross diagonally. In a preferred form, the distinct portions contact at least two thirds of the vertical and the horizontal grid elements or members at least twice.

In yet another aspect, the battery separator is compressible.

DESCRIPTION OF THE DRAWINGS

FIG. 3 An enlarged edge view of another form of the separator of FIG. 1.

FIG. 4 A diagramatic view of the battery separator of FIG. 1 with a battery grid applied thereto in phantom line to show their operable relation.

DESCRIPTION OF THE PREFERRED EMBODIMENTS

Figure 1:
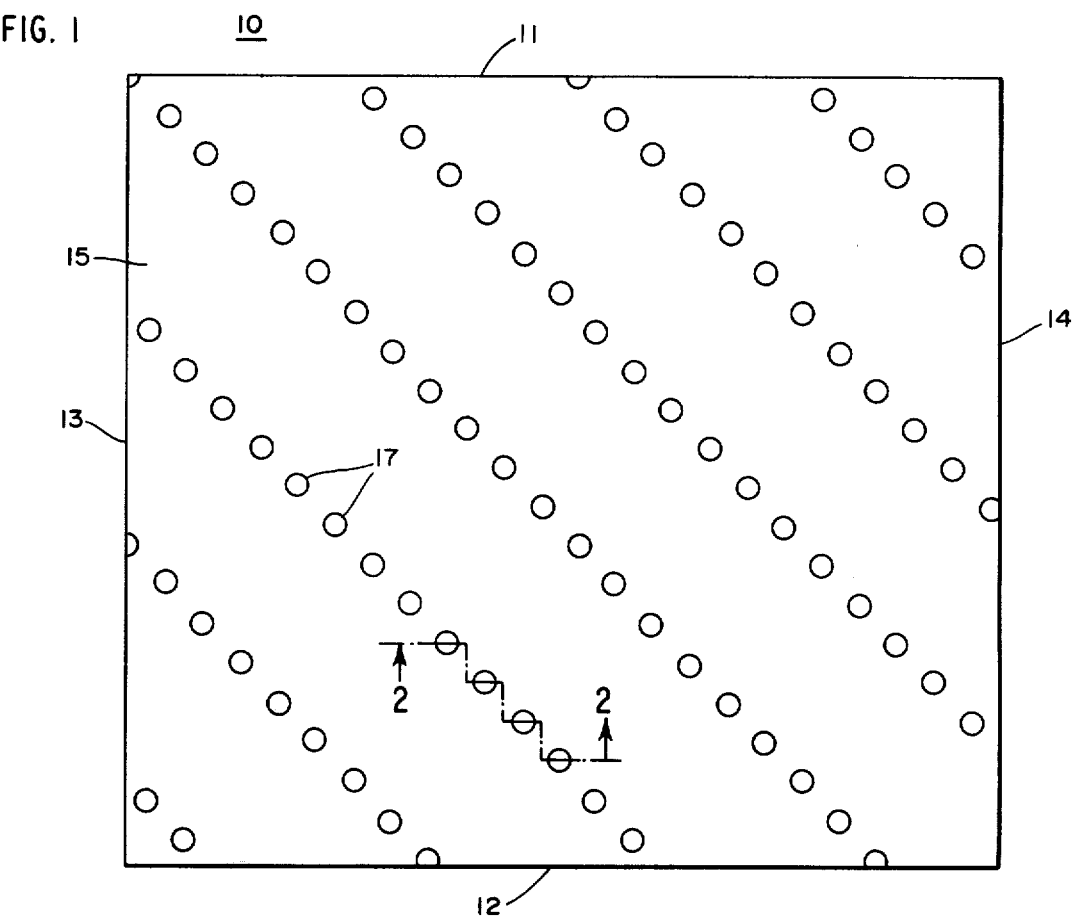
FIG. 1 A top plan view of one face of the preferred separator of this invention.

Referring first to FIG. 1 of the drawings, a battery separator 10 is shown. The battery separator 10 has a top edge 11, a bottom edge 12 and a first and a second side edge 13 and 14 respectively. The side edges extend at right angles to the top and bottom edges. The edges define the outer bounds of a rectangular sheet which is shown in actual scale in FIG. 1. The sheet is 5¾ inches wide and 5¼ inches high.

The separator 10 has two outwardly facing opposite faces 15 and 16 (FIG. 2) that have basically planar main surfaces. At least six rows of projections 17 are formed on and extend across the face 15 of the sheet 10 at an angle of 45°. In the embodiment shown there are seven rows of projections. The preferred angle at which the projections extend across the sheet is 30°–60° to each of the edges. The projections 17 are spaced about 3/16 inch apart in the rows and are substantially circular in shape with a diameter of about ⅛ inch and a height above the main surface of about 1/16 inch. The preferred height above the surface is 15–62 mils with the optimal projection, according to certain aspects, having a diameter of about ⅛ inch taken from the opposite planar main surface 16. The thickness through the main body of the separator between the main surfaces 15 and 16 is 3–30 mils providing a total separator thickness of 18–92 mils in the preferred form. The distance between the rows is preferably about 15/16 inch.

It is of importance to note that the projections in one row are offset respecting the projections in an adjacent row such that no open paths exist across the face of the battery separator parallel to any edge of the separator across two adjacent rows. In other words, any straight line drawn across the separator parallel to any edge of the separator will intersect one of the projections 17 if the line extends across two adjacent rows of projections. If this line coincides with the route followed by a battery grid element, then it would clearly be engaged by one of the projections and held away from the main surface of the separator.

A feature of the invention is found in the operating relationship between the battery separator and the battery grid in the sense that the two in combination form the final operating combination. As is known, battery grids are commonly pasted with an active material and these pasted members are called plates. The battery grid has a plurality of elements 18 extending along parallel axes as shown in FIG. 4 in phantom line. An additional plurality of elements 19 extends along second parallel axes crossing the first plurality of elements and forming a cross grid therewith. These two series of parallel elements in the most common type of automotive battery cross at right angles with a spacing of ½ inch. The two series of elements or spaced apart battery members are usually basically linear and arranged in a common plane. However, other non-linear elements are known and so long as they have a continuing aspect in a general direction, the rules of this invention apply. This is true even when the grid is made up of a plurality of curved parts. In fact, the grid is normally cast as a unitary part and thus the linear elements are actually parts of cross elements.

The battery separator is operationally installed in normal position adjacent to the pasted battery grid with the face of the separator with the projections formed thereon positioned against the pasted battery grid. The rows of projections extend diagonally across the grid elements at an angle of 30°-60° with the grid elements necessarily being aligned to fall on some of the projections when the separator and battery grid are shifted relative to one another so long as the diagonal relationship of the grid elements and the rows of projections remain within the angle of 30°-60°.

Thus, at least two groups of projections or broken separator portions are arranged in a pattern in an interconnected unit and these projections make at least one continuous coverage separator portion that diagonally crosses at least two of the linear battery elements when the separator member is in operable relation with the elements. By continuous coverage separator portion is meant a separator element or portion made up of pieces that form a continuous obstruction or wall when viewed from the direction of approach of the battery elements as indicated by the arrows 21 and 22 in FIG. 4. The projections also make a second continuous coverage separator portion that diagonally crosses at least two of the linear second battery elements extending on the second grid axes. In fact, the projections of the seven rows shown in FIG. 4 provide continuous coverage separator portions that diagonally cross substantially every one of the first and the second parallel grid axes. The preferred form would require that they diagonally cross at least two thirds of the first and of the second grid axes and contact at least two thirds of these grid elements at least twice. It may be seen that all but two of the vertical grid elements 18 in FIG. 4 are engaged by at least two projections 17 and that every one of the horizontal grid elements 18 is engaged by at least two projections 17.

Figure 2:
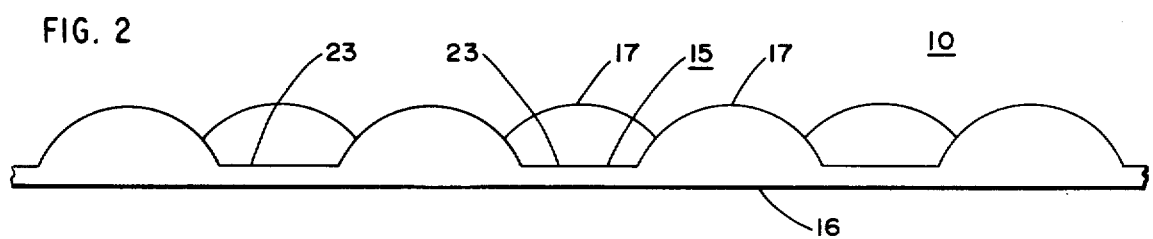
FIG. 2 An enlarged edge view of one form of the separator of FIG. 1.

Looking again at FIG. 2, it may be seen that the thickness and the mass of the sheet 10 is greater at the projections 17 than at the intermediate region 23 which makes up the greater area of the sheet. The effect of this increased thickness is to block off the area. The passage of ions may be said to effectively be limited to the areas of least resistance, i.e., the thinner intermediate areas 23. Thus, the greater the combined area of the projections is the greater the electrical resistance and the lower the final battery electrical capacity will be.

Thus, the spacing apart of the projections 17 is important, as well as their shape or size. It is desirable to block off the least area possible with the thickened areas or regions 17. The sheet 10 is cut from a long roll that is about 15 inches wide manufactured by a continuous process the preferred form of which is described in copending application Ser. No. 225,205 filed Feb. 10, 1972 and now U.S. Pat. No. 3,798,294. A 5¼ by 5¾ sheet cut from the roll stock will necessarily contain a minimum of six row of projections 17 which gives the necessary minimum amount of separation contact or support to provide the necessary spacing between the main surface 23 of the separator sheet 10 and the battery plate. As shown in FIG. 1, the random cutting of the sheet may produce up to seven rows of projections. The important feature is that substantially two complete continuous coverage separator portions cross every one of the battery grid elements. In a cross grid this means two diagonal continuous coverage separator portions in each direction or across both sets or series of grid elements. It can be seen that the same projections may be considered once with respect to the continuous coverage separator portion for each series of grid elements if properly positioned. If this is done, then two hits on every element are assured which gives adequate spacing support. As shown in FIG. 4, this was achieved in the case of the horizontal grid elements 19, but was not quite achieved in the case of the vertical grid elements 18. Thus, it may be surmised that if the rows of projections, in the example illustrated in FIGS. 1 and 4 were combined, each row with one adjacent row, two complete continuous coverage separator portions would be formed across the horizontal grid elements 19 but slightly under two complete continuous coverage separator portions would be formed across the vertical grid elements 18.

If the projections 17 are physically superimposed, they do not make a continuous diagonal line. The spacing between the projections is 3/16 of an inch in a row while the projections themselves have a diameter of only 2/16 of an inch. Thus, their blocking or continuous coverage separator portion value is greater than their actual physical diagonal coverage if combined. This enables the battery separator in FIGS. 1 and 4 to have no more than and generally less than the resistance that would be created by only two continuous ribs across the sheet. Preferably, the raised portions or projections 17 constitute or cover less area than the area of the face that they do not cover. In other words the projections 17 preferably cover less than 50% of the surface area of the separator face 15 and usually more preferably less than 25% and most preferably less than 20%.

There is another way of describing the structural relationship between the projections in the separator sheet and the first and second parallel axes of the grid elements or members. FIG. 4 reveals that in forming a continuous coverage separator portion applicable to each series of grid elements the projections may be described as being spread apart on the first parallel axes and on the second parallel axes to form the rows and because they form a continuous coverage separator portion, they necessarily contact the grid elements on the axes of which the portions are spread apart.

Figure 2A:
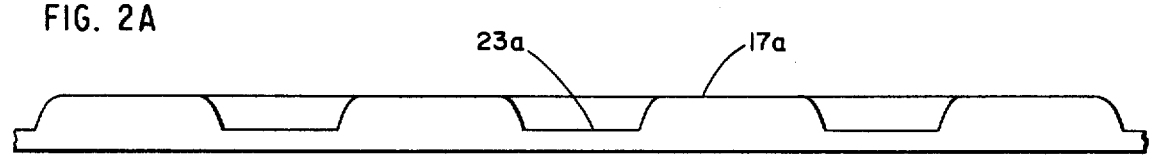
FIG. 2A An enlarged edge view of another form of the separator of FIG. 1.

A variation of the battery separator cross section in FIG. 2 is shown in FIG. 2A. In this variation the tops of the projections 17a are flattened, preferably by secondary calendering as shown in copending application Ser. No. 225,205 which is owned by the same assignee as the present invention. This not only assures a uniform projection height, but also aids in stablizing the sheet against being urged to move by its engagement with the grid members which would tend to try to slide down the sloping surfaces of the rounded projections 17 of FIG. 2. The flattened projections 17a may be seen to extend above the intermediate regions 23a.

Another variation of the battery separator cross section of FIG. 2 is shown in FIG. 3. In this cross sectional configuration, the mass of all regions of the sheet 25 are the same. In other respects, the sheet is the same as separator 10. The preferred sheet 25 of FIG. 3 is also preferably made, as taught in U.S. patent application Ser. No. 225,205, from the plastic material of U.S. Pat. No. 3,351,495. The thickness or mass of the separator 25 is maintained constant by providing indentations 26 that extend inwardly into the face 27 of the battery separator exactly opposite the projections 28 in the face 29 so that as may be seen the thickness of the battery separator between the projections and at the projections is maintained constant.

This battery separator is compressible when made from the preferred resilient material of U.S. Pat. No. 3,351,495. Especially good compression qualities are present when the preferred sheet thickness of 3–30 mils is present. The compressible battery separator sheet's two opposite main basically planar faces 27 and 29 are embossed. The embossments or projections 28 formed in the sheet are discontinuous across said sheet in the same manner as projection 17. They extend out from at least one of the main planar faces and are depressed into the opposite main planar face and compressible toward the main planar face they extend out from. The sheet's resiliency constantly forces the embossments back toward their non compressed positions when the embossments are compressed. The sheet can be embossed so that adjacent areas of the sheet are formed into projections that extend from opposite sides of the sheet with corresponding opposite depressions.

As shown in FIG. 3, the embossment 28 is a true spherical portion. This has been found to give the best stress characteristics under compression. Other arcuate tent like structures are also satisfactory. However, long ribs and sharp or flat sided projections tend to give stress cracking problems and the like and while in a few special instances they may be operable, they are generally not preferred.

Each of the projections in sheet 10 and sheet 25 is preferably shaped so that material shed from the plates and other sediment in the battery will not pile up significantly thereon but will tend to slide off and fall on down in the battery. Thus, the individual separator portions or projections have a substantial upwardly disposed slope. In the preferred form, the arcuate upwardly disposed surfaces of the round projections 17 and 28 have this characteristic. Of course, many other shapes could be utilized such as a roof top type arrangement having sloping surfaces which would allow sediment to slide downwardly and off of the edges thereof and other curved surfaces such as oval shaped members.

Figure 5:
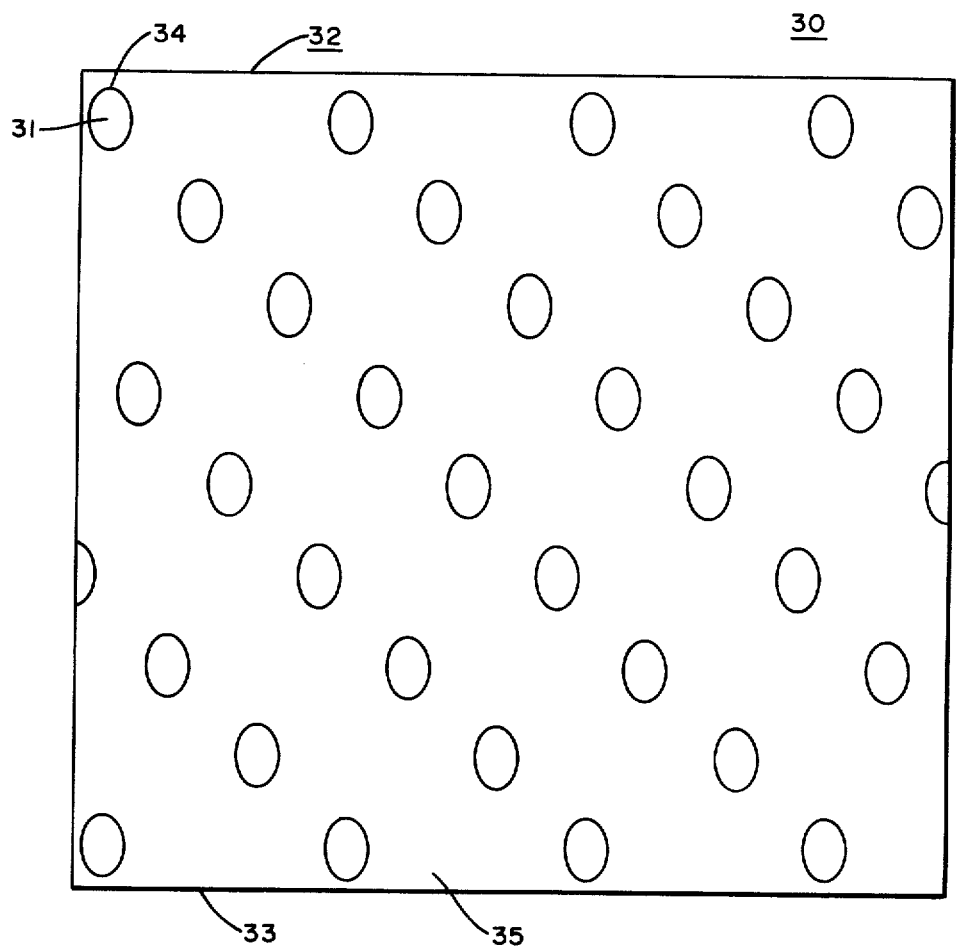
FIG. 5 A variant battery separator of this invention.

Turning our attention to the variant form of the invention of this application shown in FIG. 5, it may be seen that in FIG. 5 more than two groups of broken portions or projections are arranged in a pattern in an interconnected unit or sheet 30. In this instance three rows of somewhat oval shaped projecting members 31 are arranged to diagonally cross the grid elements, preferably at the preferred angle of 30°–60° as previously set forth. This assures that the grid elements will be aligned to fall on some of the projections if the separator and battery grid shift relative to one another so long as the diagonal relationship of the grid elements and the rows of projections remain within the intended angle. It may be seen for example, that one cannot draw a line across the separator 30 from the top side 32 to the bottom side 33 at a right angle to the top 32 without crossing one of the projecting members 31.

The projecting members 31 are curved at their upper ends 34. Thus, sediment falling down along the face 35 of the separator 30 will not be retained on the upper surfaces of the projecting members 31.

Certain aspects of the separator of the present invention may be described mathematically. The raised means or projections 17 will be located on the separator 10 with reference to an arbitrary scaling system. The vertical scale will be assigned K evenly spaced increments and the horizontal scale will be assigned J evenly spaced increments. $k$ represents any location on the vertical scale and $j$ will represent any location on the horizontal scale. Now the location of a projection, D, can be established by the notation $D(j,k)$ where $k$ and $j$ take on appropriate K and J scale values.

Now if it is desired to block the passage across the face 15 of the separator 10, a continuous vertically and horizontally blocking series of D's must be arranged across the separator. In carrying out this desire, the rule may be postulated that every $j$ unit and every $k$ unit must always be used. Then given an initial pattern of D's that satisfies the rule, variations of pattern can be made by moving the projections about on the separator in definable ways that will not disrupt the completeness of the blocking value. A mathematical description of the moving rules that have just been described may be illustrated as follows.

$$D_1(j_1,k_1) \rightarrow D_1(j_1,k_2)$$

$$D_2(j_2,k_2) \rightarrow D_2(j_2,k_1)$$

$$D_1(j_1,k_1) \rightarrow D_1(j_2,k_1)$$

$$D_2(j_2,k_2) \rightarrow D_2(j_1,k_2)$$

These formulas describe the pair wise movement of projections such that if one projection is arbitrarily moved to a new location a second projection can be identified and appropriately moved to a new location to establish a new pattern with the same blocking value.

This system can be easily visualized in application to FIG. 1 where K could be assigned to the vertical edge 13 of the separator 10 and J could be assigned to the lower edge 12. Then the projections 17 could be moved about on the face 15 of the separator by application of the system without sacrificing the completeness of the blocking value.

Another valuable rule to apply is to be sure that a substantially equal number of D's are present in the end product in each quadrant of the face. It may be appreciated that if the raised means D are not distributed substantially evenly on the face of the separator, one face of the separator might have its basic surface level engaged directly against the material the raised means are intended to space the basic surface level from. Thus, the raised means should be distributed on the face substantially evenly if the face is bisected vertically and horizontally into four equal parts.

The distinct separator portions in some rows are offset with respect to the distinct separator portions in other rows so that when the separator and the member having the grid are in normal operable relation the first series of grid elements and the second series of grid elements will necessarily be aligned to fall on some of the distinct separator portions in any position in which the separator may be shifted while maintaining the diagonal relationship of the rows of distinct separator portions and the series of grid elements. Thus, a separator is provided that when matched in normal operable position with a battery grid will assure proper spacing in the battery irrespective of the positioning of the separator and the battery grid with respect to one another, so long as the angle is maintained. In other words, in cutting the manufactured separator sheet which would be much larger than the individual separator in normal circumstance, it is not necessary to make sure that the sheet is cut in exactly the same position with regard to individual separator portions as would be the case with portions that would have to be positioned specifically to contact individual grid wires or elements. Further more, the sheet may be cut so that its machine direction forms either the vertical or the horizontal direction when the separator is used.

While for simplicity and clarity, the invention of this application has been described in general with respect to discrete sheets cut to conform to use with a single face of a battery plate, the invention is anticipated to have even greater value for application in longer rectangular sheet form for "wrapping" a series of battery plates. By wrapping, it is to be understood that a specific length of separator material is preferably formed into an S wrap around juxtapositioned battery plates for use in a single battery cell. A single long piece of separator material can thus have face 15 at one end of sheet 10 (FIG. 2) placed against the first outer positive plate. The sheet is then bent around the edge of the positive plate and face 15 is engaged against the back of the positive plate. This places the face 16 of the sheet 10 against the adjacent negative plate. The sheet 10 is then bent around the edge of the negative plate and the face 16 is engaged against the back or opposite side of the negative plate. This engages the face 15 against the adjacent positive plate. The sheet is then bent around the edge of the positive plate and so on until the sheet is woven back and forth through the plate assembly for a battery cell. This in effect provides the separator characteristics of the independent discrete separator sheets to each battery plate face.

The improved battery separator of this invention has a first face with a first basic surface level having a plurality of independent means extending thereabove. The independent means is discontinuous across the face both vertically and horizontally and yet no open path exists across the face either vertically or horizontally. To facilitate the passage of sediment around the independent projecting means, they have continuously convex outer side surfaces and to aid uniformity of thickness in the separator sheet, the outer tips of the projections are flat.

The separator material of this application can also be formed into envelopes that may be slipped over the individual positive plates. The outer inside faces of the envelope would be composed of face 15 while the outside face would be composed of face 16. Of course, both faces may on occasion have the structure illustrated only on face 15 in the drawings of this application. The face 16 could also have other structures such as slight ribbing.

By another feature of the invention of this application, a superior compressible battery separator is provided that allows the battery plates and separators for a cell to be assembled and then mechanically compressed and inserted in a cell compartment achieving a secure fit without the use of shims.

It will be obvious to those skilled in the art that various changes and modifications may be made in the invention without departing from its true spirit and scope. It is, therefore, aimed in the appended claims to cover all such equivalent variations as fall within the true spirit and scope of the invention.

We claim:

1. In a battery, having a battery plate and a battery separator, said separator having a top edge, a bottom edge and a first and a second side edge defining the outer bounds of a rectangular sheet having a face with a plurality of projections thereon spacing said face from said battery plate the improvement comprising arranging said plurality of projections on said separator so as to be discontinuous across said face both vertically and horizontally and positioned so that no open path exists across said face vertically or horizontally, said projections covering less than 25% of the surface area of said face.

2. In the battery of claim 1 said battery separator's projections spaced apart a greater distance than their greatest dimensions.

3. In the battery of claim 2, said battery separator's projections arranged in at least six rows formed extending across said face at an angle of 30°–60° to each of said edges, the projections in each row having open paths therebetween across the face of said separator parallel to any edge of the separator and the projections in adjacent rows offset to thereby provide that no open path exists across the face of said separator parallel to any edge of the separator.

4. In the battery of claim 3 wherein said battery separator's projections are substantially uniform in dimension, substantially circular in shape, spaced apart in the rows about 3/16 inch, have a diameter of about ⅛ inch and a height above the main surface of 15–62 mils with the separator having a total thickness of 18–92 mils, said projections covering less than 20% of the surface area of said one face.

5. In the battery of claim 3 wherein said battery separator's projections have flat outer tips, continuously convex outer side surfaces and said separator has a second face facing outwardly opposite said first face, the first said face and said second face having basically planar main surfaces with said second face having no projections thereon.

6. In the battery of claim 3 wherein each of said battery separator's projections is shaped so that material shed from the plates of said battery and other sediment in the battery will not pile up significantly thereon but will tend to slide off and fall on down in the battery.

7. The battery of claim 2 wherein said battery has pasted battery plates with a plurality of grid elements crossing one another at right angles and arranged in a first plane, said battery separator being positioned adjacent to said grid elements with at least a portion of its face having said projections positioned against said grid elements; said projections arranged in rows extending diagonally across said grid elements at an angle of 30°–60° with said grid elements each being aligned to fall on at least one of said projections when the separator and grid elements are shifted relative to one another so long as the diagonal relationship of the grid elements and the rows of projections remains within an angle of 30°–60° and wherein said grid elements crossing one another at right angles extend along first parallel axes and second parallel axes respectively and said projections are spread apart on the first parallel axes and the second parallel axes to form said rows and to form continuous coverage separator portions that contact said grid elements on the axes of which its portions are spread apart.

8. In the battery of claim 7 wherein said battery separator's projections contact at least two thirds of said grid elements at least twice.

9. In a battery with pasted battery plates having a plurality of grid elements crossing one another at right angles and extending along first parallel axes and second parallel axes respectively and arranged in a first plane, and an improved battery separator, said battery separator being a discrete rectangular sheet having a top edge, a bottom edge and first and second side edges extending at right angles to said bottom edge; said sheet having two outwardly facing opposite faces that have basically planar main surfaces; the improvement comprising at least one of said faces having at least six rows of projections formed on and extending thereacross at an angle of 30°–60° to each of said edges; said projections being of substantially uniform dimensions, substantially circular in shape, spaced apart a greater distance than their diameter and covering less than 25% of said face; the projections in one row offset respecting the projections in an adjacent row such that no open path exists across the face of said battery separator parallel to any edge of the separator across two adjacent rows and said projections spread apart on said first parallel axes and said second parallel axes in said rows and forming continuous coverage separator portions; and said battery separator being positioned adjacent to said pasted battery plate with said face with said projections formed thereon positioned against said battery grid with said rows extending diagonally across the grid elements at an angle of 30°–60° with said projections contacting all of the grid elements at least once and two thirds of said grid elements at least twice when the separator and battery grid are shifted relative to one another so long as the diagonal relationship of the grid elements and the rows of projections remains within an angle of 30°–60°; the shape of said projections causing material shed from the plates and other sediment in the battery to tend to slide off and fall on down in the battery and not pile up significantly on said projections.

* * * * *